United States Patent [19]
Widmann

[11] Patent Number: 5,476,570
[45] Date of Patent: Dec. 19, 1995

[54] APPARATUS TO MAKE PLASTIC SEAMED JACKETS, REINFORCED JACKET STRUCTURES, AND THE LIKE

[75] Inventor: Werner Widmann, Plochingen, Germany

[73] Assignee: Karl Widmann Schweissmaschinen GmbH, Schlierbach, Germany

[21] Appl. No.: 228,760

[22] Filed: Apr. 18, 1994

[30] Foreign Application Priority Data

Apr. 28, 1993 [DE] Germany ............... 43 13 875.6

[51] Int. Cl.⁶ .................................. B23K 28/02
[52] U.S. Cl. .................. 156/515; 156/73.3; 156/553; 156/580.2
[58] Field of Search ................ 156/73.1, 73.3, 156/515, 580.1, 580.2, 553

[56] References Cited

U.S. PATENT DOCUMENTS

| | | | |
|---|---|---|---|
| 3,733,238 | 5/1973 | Long et al. | 156/580.1 |
| 4,227,959 | 10/1980 | Brown | 156/515 |
| 4,582,239 | 4/1986 | Scotto | 228/1.1 |
| 4,863,542 | 9/1989 | Oshefsky et al. | 156/60 |

OTHER PUBLICATIONS

"Schweisstechnik" (Welding Technology), Berlin 39, 1989, article by Helmut Wirth, of Branson Ultraschall (Branson Ultrasonics), Heusenstamm, German, based on an oral presentation during the Spring Fair in Leipzig, Germany, 1988, entitled Vibration Welding—a welding process for all thermoplastics, pp. 168–70, esp. left col. and right col. of p. 169, right col. p. 170.

Handbuch der Fertigungstechnik, ("Handbook of Manufacturing Technology"), vol. 5, Fügen, Handhaben und Montieren (Joining Handling and Assembling), by Prof. Dr.–Ing. Dr.h.c. Günter Spur, published by Carl Hanser Verlag, Munich, Vienna, Chapter 2.5.7.5, Ultraschallschweissen (Ultrasonic Welding) by H. Thews, p. 331 et seq.

Primary Examiner—James Engel
Assistant Examiner—J. Sells
Attorney, Agent, or Firm—Frishauf, Holtz, Goodman, Langer & Chick

[57] ABSTRACT

To weld together thermoplastic foils to form folders or binder jackets (1), in which the thermoplastic material is difficult to weld by externally supplied heat, an ultrasonic generator is coupled to a plurality of sonotrodes (41), assembled in a sonotrode system (17), against which a welding head (16) is reciprocated, with the foils (24) between the welding head and the sonotrode system (17). The sonotrodes are excited by ultrasonic energy, and secured to a machine frame (14) by attachment posts (45, 45') which are coupled to the sonotrodes (41) or the machine frame (14), respectively, at locations where the sonotrodes or the posts, respectively, have wave nodes when excited to ultrasonic oscillations, so that, effectively, no ultrasonic energy is coupled to the machine frame. The ultrasonic energy is supplied to the sonotrodes by an ultrasonic generating system (52, 53) coupled to one surface (51) of a beam or rail-like sonotrode (41), the opposite surface (42) of which forms an engagement surface for the plastic foils (24), pressed thereagainst by welding edges (68), and optionally having cutters (67, 68) thereon to sever welded foils or jackets (1) adjacent the location where respective weld seams (8, 9, 11) have been made.

23 Claims, 10 Drawing Sheets

APPARATUS TO MAKE PLASTIC SEAMED JACKETS, REINFORCED JACKET STRUCTURES, AND THE LIKE

REFERENCE TO RELATED LITERATURE

"Handbuch der Fertigungstechnik" ("Handbook of Manufacturing Technology"), Vol. 5, "Fügen Handhaben und Montieren" ("Joining, Handling and Assembling"), by Prof. Dr.-Ing. Dr. h. c. Günter Spur, Editor-in-Chief, published by Carl Hanser Verlag, Munich, Vienna, Chapter 2.5.7.5, "Ultraschallschweissen" ("Ultrasonic Welding") by H. Thews, pp. 331 et seq.

"Fügen von Formteilen und Halbzeugen aus thermoplastischen Kunststoffen mit Ultraschal. Verfahrens-, Konstruktions- und Anwendungsempfehlungen". Sonderdruck des Fachverbandes Elektroschweissgeräte im ZVEI. ZVEI-Verlag. ("Joining of shaped parts and intermediate structures of thermoplastic material by ultrasound. Recommended methods, constructions, and use"). Reprint by the Technical Society of Electrical Welding Apparatus of the Association of Electrical Engineers, ZVEI; ZVEI publishers, Frankfurt, 1984.

"Kunststoff-Schweissgeräte und -Maschinen". Kunststoffe 73 ("Plastic Welding Apparatus and Machinery"), published in "Man-Made Materials", Vol. 73 (1982) 12, pp. 768–771.

FIELD OF THE INVENTION

The present invention relates to an apparatus to make seamed jackets of plastic foil material, for example reinforced outer covers for ring binders and the like, in which the plastic material is difficult to weld by heat-welding, for example made of polyolefins such as polypropylene, which cannot be welded by high-frequency welding.

BACKGROUND

Plastic jackets, and also reinforced plastic jackets or covers, are usually made by feeding two webs of plastic foil material to a seaming machine; the foils are then welded at weld seams along immediately adjacent edges. Covers for ring binders and the like are made in a similar manner; stiff inserts, for example of cardboard material or the like, are inserted between the foils which, then, are welded together by surrounding weld seams. At predetermined bend or fold or crease lines, additional weld seams can be formed, extending for example generally between longitudinal edges of the seamed foils, to form predetermined bend or fold zones or "living hinges".

Machines are used to form the jackets, whether reinforced or not, to which the webs are supplied in form of long foils, rolled off from supply rolls. The machines use vertically reciprocating welding heads which are formed with welding and selectively with cutting edges, corresponding to the contour of the jackets or covers to be made. A heating arrangement is located in the machine frame or in a base opposite the welding head which is used to plasticize the foils in the region of the weld head, which may be formed, additionally, with cutting edges. The foils are plasticized or made tacky or partially liquefied, so that the desired intimate weld connection between the foils is obtained. At the same time, knife-like cutting edges can form the desired outline during the welding process.

There is a danger that the foil will adhere to the heated base upon plasticizing the foil with heat. Usually, therefore, a separating foil is inserted between the heating arrangement and the foils to be actually worked on. This separating layer, usually, is an elongated web or foil itself, of a material which prevents undesired adhesion and tacking of the foils to be welded with the machine base or the Weld base.

Heat-welding of this type, in which a heater is used has a disadvantage in that the heat is derived only from one side. During the welding process, and within the overlapping foils, this leads to a substantial temperature gradient. Consequently, the side of the foil adjacent the heating structure is heated to a substantially higher extent, and will be more softened or plasticized than the side adjacent the welding head or welding punch portion.

The foil may also be plasticized in a different manner, and, as well known, by subjecting it to high-frequency radiation. This method, however, can be used only with foils which have a poor electrical loss angle. High frequency passes through other foils, without heating the foils. Polyolefins, for example polypropylene, are often preferred due to environmental considerations, and such material cannot be handled by high-frequency heating apparatus.

Apparatus to manufacture foils, and particularly reinforced foils or similar articles, from elongated foil webs have another problem, namely the resulting scrap. Usually, the welding heads or welding stamps, together with the cutting edges on the welding heads, are the image of the weld seams and the cut edges of the finished product. The result is scrap having the appearance of a rope ladder, which is obtained when the products are separated out from the web. This rope ladder-like scrap is difficult to handle.

THE INVENTION

It is an object to provide an apparatus which is capable of welding plastic foils to form jackets, reinforced jackets and the like, of a material which has a small electrical loss angle, and, which preferably is so arranged that the scrap, after manufacture of the foils or jackets, is a minimum.

Briefly, the welding head, shaped to match the contour of the weld seam, is located opposite a sonotrode system having a plurality of sonotrodes which are acoustically coupled to ultrasound generators to excite the sonotrodes to ultrasonic vibrations. For welding, a welding head having the outline of seams to be formed is moved, with the foils interposed, against the sonotrode system and the weld is obtained by ultrasonic heating of the material where the welding head presses the foils against the sonotrodes of the system.

As used herein, a sonotrode is an acoustic wave conductor through which acoustic waves are introduced from a generator, or a medium, and/or from which the acoustic waves leave, and can be introduced into a different medium—in analogy to an electrode, with respect to electrical waves. Sonotrodes are well known in ultrasonic welding technology. Ultrasonic welding technology has been used to weld together thermoplastic materials as well as metals. It is suitable because it is easily automated, and has high-economic efficiency. Welding times, usually, are below 1 second, and thus the ultrasonic welding process is particularly suitable for mass production articles.

Ultrasonic welding of thermoplastic materials is carried out by converting mechanical oscillating energy into the necessary heat energy to plasticize plastic material. The mechanical energy is generated by a transducer, coupled to the sonotrode; the energy is then transferred by the sonotrode on the plastic material. The energy introduced into the sonotrode, and then into the plastic material, is transformed therein into heat by the resulting molecular and boundary surface friction. Mechanical losses in the plastic material determine the necessary power and amplitude at the engagement surfaces of the sonotrode with the plastic. Plastic materials which can be readily welded, for example polystyrol, use amplitudes of the welding tool or sonotrode in the order of about 15–20 µm; partially crystalline plastic materials such as polyacetyl resins may use higher amplitudes.

Sonotrodes are frequently made of titanium; suitable ultrasonic frequencies are between 20 kHz to 40 kHz.

Ultrasonic acoustic energy is suitably generated by a magnetostrictive transducer, operable in the kilowatt range, and coupled to a booster which, in effect, is a frequency matching or wave-length matching element to excite the sonotrode from the transducer in such a manner that, within the sonotrode, a standing wave will result, having a wave antinode or peak at the engagement surface of the sonotrode with the foil material. The foil material for welding is pressed against the sonotrode by the welding head.

Ultrasonic welding is described, for example, in

"Handbuch der Fertigungstechnik" ("Handbook of Manufacturing Technology"), Vol. 5, "Fügen, Handhaben und Montieren" ("Joining, Handling and Assembling"), by Prof. Dr.-Ing. Dr.h. c. Günter Spur, Editor-in-Chief, published by Carl Hanser Verlag, Munich, Vienna, Chapter 2.5.7.5, "Ultraschallschweissen" ("Ultrasonic Welding") by H. Thews, pp. 331 et seq.

"Fügen von Formteilen und Halbzeugen aus thermoplastischen Kunststoffen mit Ultraschall. Verfahrens-, Konstruktions- und Anwendungsempfehlungen". Sonderdruck des Fachverbandes Elektroschweissgeräte im ZVEI. ZVEI-Verlag. ("Joining of shaped parts and intermediate structures of thermoplastic material by ultrasound. Recommended methods, constructions, and use"). Reprint by the Technical Society of Electrical Welding Apparatus of the Association of Electrical Engineers, ZVEI; ZVEI publishers, Frankfurt, 1984.

"Kunststoff-Schweissgeräte und -Maschinen". Kunststoffe 73 ("Plastic Welding Apparatus and Machinery"), published in "Man-Made Materials", Vol. 73, (1982) 12, pp. 768–771.

The apparatus which uses ultrasonic energy for welding does not require any heated elements to which the foils might adhere. Further, the ultrasonic energy penetrates the foils essentially uniformly, so that there will hardly be any temperature differences between the foils. Thus, the foil which is remote from the welding stamp head is no longer heated more than the one adjacent the welding head. Due to the uniform heating of the foils, inherently within the foils and not by heat conduction towards the foils, it is possible to obtain higher throughput through the welding machine, and thus higher production speeds for the articles to be made. Plastification or plasticizing of the foils by use of ultrasonic energy is independent of electrical characteristics of the material, and hence of the electrical loss angle of the foil. Plasticizing is obtained by heating due to molecular oscillations excited within the foils themselves.

Ultrasonic welding has a substantial advantage with respect to high-frequency welding in that it is completely safe; in high-frequency welding, the danger of spurious radiation leakage along the machine is always present; such high-frequency radiation may be dangerous to the health of operators.

When using ultrasonic welding, only those regions of the foils are heated which are pressed with a certain minimum engagement pressure against the ultrasonic radiation transmitters or sonotrodes, since only in those locations it is possible that the ultrasonic energy can be introduced into the foil. Thus, those regions of the foil which lie only loosely on the machine are not heated. This is a substantial advantage with respect to apparatus which operates with heating stations.

In accordance with a feature of the invention, the sonotrode arrangement or system is built of an assembly of individual sonotrode elements. This is possible since the weld seams to be made have only a comparatively small area with respect to the remainder of the foil. Each one of the sonotrode elements is formed with an engagement surface for the foils, which is so arranged that all the engagement surfaces or support surfaces are in a common plane. These engagement surfaces, unless the contours of the weld seams require a different arrangement, usually engage each other in an essentially gapless arrangement.

The structure of the sonotrodes can be made economically if the sonotrodes are formed as longitudinal elements, having the longitudinal axes of their engagement surfaces parallel to the welding head edges. The welding head edges may have cutting edges coupled thereto. Preferably, the sonotrodes are formed as elongated rails or beams.

In accordance with a preferred feature of the invention, the ultrasonic generator apparatus is located centrally—with respect to the engagement surface of the foil—and opposite the sonotrode engagement surface. This results in a particularly good energy distribution. The ultrasonic oscillation generator can be so arranged that it will excite the sonotrodes to longitudinal oscillations in such a way that a standing wave will form thereon, in which the maximum amplitude or antinode of the acoustic wave of the oscillation occurs just at the engagement surface of the sonotrode.

DRAWINGS

DETAILED DESCRIPTION

Figure 1:
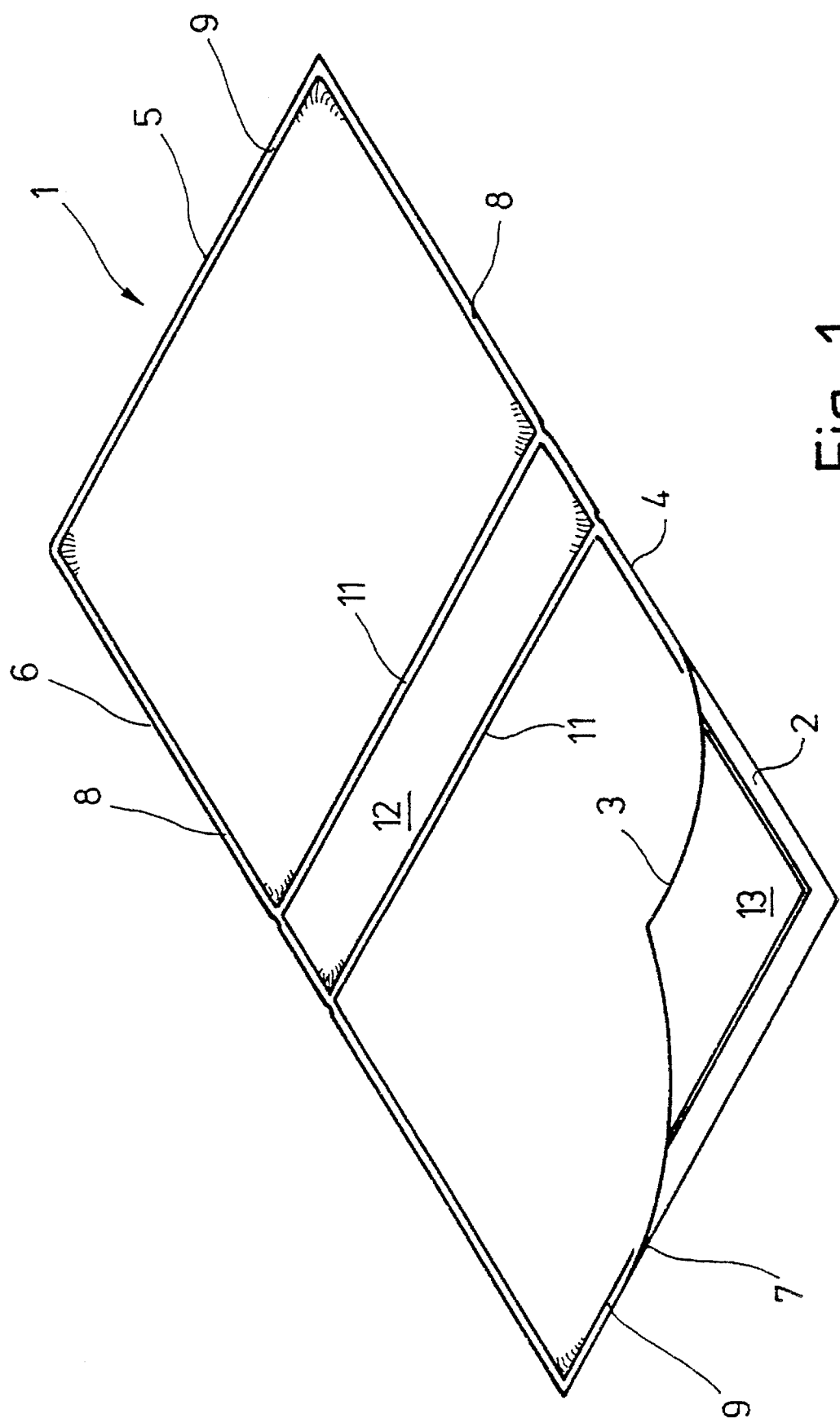
FIG. 1 is a perspective view of a reinforced ring binder jackets constructed of two edge seamed superposed foils.

The invention will be described in connection with an example of a reinforced cover for a ring binder, shown in perspective plan view in FIG. 1. The ring binder cover 1 is made of two thin cut foils 2, 3. The cut foils are welded together along the outer edges 4, 5, 6 and 7 with continuous weld seams 8, 9, respectively. The weld seams 8 and 9 are, respectively, parallel to each other. Additional weld seams 11 extend transversely across the weld seams 8, parallel to the seams 9. These weld seams define predetermined or prelocated bending points of the cover 1 and, between the seams 11, define a region 12 in which a product, for example snap rings for a ring binder or the like, a ring binder itself, the back of a book or the like can be located. The weld seams 11 abut the weld seams 8 at their respective ends.

The cover 1 is reinforced by placing reinforcement inserts 13, for example of cardboard material, between the foils 2 and 3, as seen at the open ends at the lower right of the cover 1. The inserts 13 are of the same size as, or just slightly smaller than, the surfaces which are connected by the weld seams 8, 9 and 11. A smaller, suitably dimensioned reinforcement can be located in the region 12 between the two weld seams 11.

In accordance with a feature of the invention, all weld seams 8, 9 and 11 are formed by an ultrasonic welding apparatus, by which the plastic foils 2, 3 are plasticized and seamed together, to then form the weld seams 8, 9, 11. The plastic foils may be made of any suitable thermoplastic material, for example of polyolefins, such as polypropylene. These materials cannot be welded by high-frequency welding.

Figure 2:
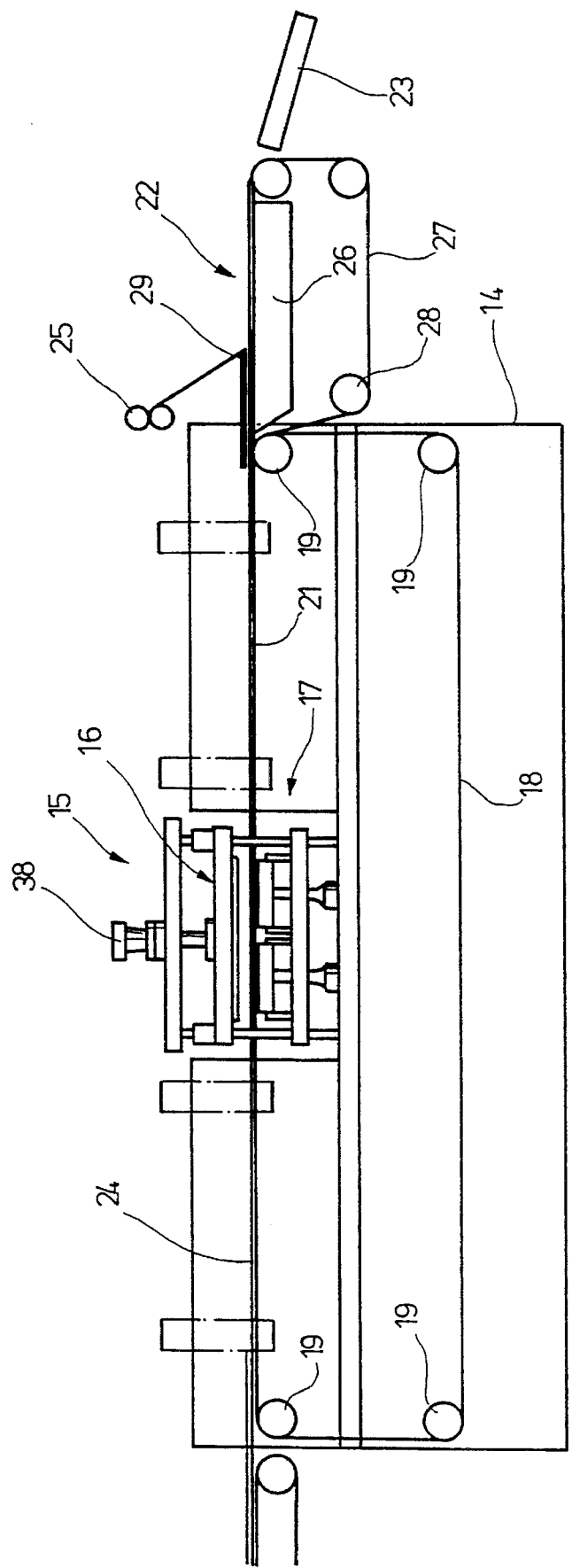
FIG. 2 is a highly schematic side view of an apparatus for forming weld seams and making severing cuts, to construct the jacket of FIG. 2.

FIG. 2 is a highly schematic view of the apparatus to make the cover jackets 1 illustrated in FIG. 1. Basically, the machine of FIG. 2 has a machine frame 14 on which a welding station 15 is located. The welding station 15 has a welding head 16 and a sonotrode system 17 beneath the welding head 16.

An endless transport belt 18 runs lengthwise of the machine frame 14, supported for rotation by four rollers 19, one of which, for example, may be driven. The width of the transport belt 18 is preferably equal to the maximum width of the foil web which is to be handled by the machine. The transport belt 18 has a working or operating run 21, which passes between the welding head 16 and the sonotrode system 17. It starts upstream from the welding station 15, and terminates downstream from the welding station 15 in a vacuum transport system 22, which is used to remove the finished, welded covers 1 separated from each other and feed them to a stacking table 23 or a bin.

The welding stations 15 receive two foils 24 from suitable supply rollers, not shown. The supply rollers, from which the foil webs or tapes 24 are rolled off, are located, with respect to FIG. 2, on the left of the machine, and may be of any suitable construction. The reinforcements 13 are introduced between the foils 24, in well known manner, and properly positioned. The apparatus for introducing the reinforcements 13 in appropriate position are well known, and do not form part of this invention, and are not illustrated in FIG. 2.

The sandwich-like arrangement formed by a lower foil web, reinforcement inserts 13, and the upper foil web, is transported to the welding station 15 where, upon downward movement of the operating head 16, the foil webs 24 are welded together along the weld seams 8, 9, 11 (FIG. 1). The welding head 16 reciprocates in cadence, driven by a suitable reciprocating drive and shown, schematically, only by the double arrow 16a. Electrical or, preferably, fluid-operated reciprocating apparatus can be used.

For welding, the welding head 16 moved downwardly towards the sonotrode system 17, which is in fixed location on the machine, in order to plasticize the foil webs 24 and form the weld seams 8, 9, 11. As the welding head 16 is moved downwardly in FIG. 2, the then formed, welded jackets are simultaneously separated from the supplied foils; the excess or scrap material is trimmed off from the jackets 1.

After welding, the foil webs 24 are on the working run 21 of belt 18. The jacket covers 1 are separated from the scrap of the foil webs 24 at the vacuum system 22. They are transported by the transport belt 18 to the vacuum system 22. The transport and pull-off rollers 25 wind up the scrap web remaining from the foil webs 25, which is now in strip form, for further removal.

The vacuum system 22 has a vacuum box 25 over which an endless apertured belt 27 runs. The belt 27 is maintained in position by rollers 28, of which only three are shown for simplicity, located in the frame 14 of the machine. The vacuum system belt 27 operates in the same direction as the transport belt 18. The vacuum box 22 is constructed and located to adhere the severed covers 1, by vacuum, so that they will easily separate from the scrap, and tear off the scrap strips, rolled up by rollers 25, even if the separating or cutting operation during welding did not completely separate the web material from the outer scrap. The scrap strips are rolled off over an edge 29 located above the vacuum box 26. The vacuum system 22 pulls the finished welded covers 1, by vacuum, against the apertured vacuum system belt 27, to then transport the finished jackets 1 to the removal table or a removal bin 23, while the scrap strips from the foils 24 are pulled upwardly about edge 29 by the removal rollers 25.

The construction of the welding station 15 will be described with reference to FIGS. 3–7.

Figure 3:
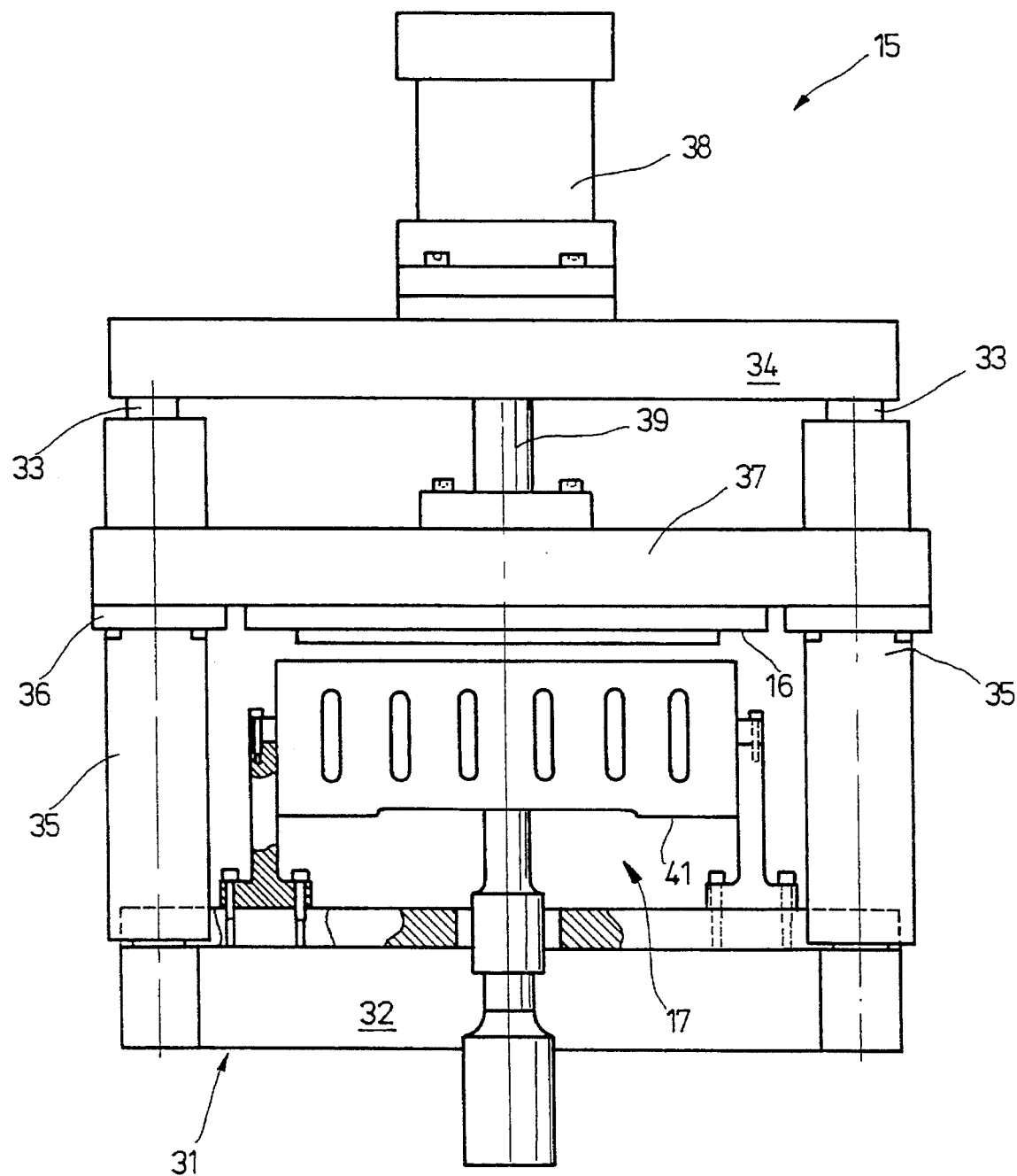
FIG. 3 is a fragmentary enlarged view of the apparatus of FIG. 2 looked at in a direction parallel to the transport of foil material within the apparatus of FIG. 2.

The welding station 15—see particularly FIG. 3—is generally constructed in form of an open frame or portal. It has a lower frame part 31 formed by cross connecting beams 32.

Four essentially cylindrical posts 33 project from the frame part 31. Cross yokes 34 connect the upper ends of the posts 33, so that the yokes 34 are parallel to and spaced from the lower frame part 31. Each of the four posts 33 is surrounded by a guide bushing 35 which, close to its end, has a ball guide bushing (not visible in the drawing). Each of the bushings has a projecting flange 36 which supports a platform 37, secured by screws 38 to the flange 36. The platform 37 forms the attachment surface for the welding head 16.

A double-acting pneumatic cylinder 38 is secured to the upper side of the cross beam 34. The piston rod 39 of the pneumatic cylinder 38 is coupled to the upper side of the platform 37, so that the platform 37 can be moved up and down, in accordance with the arrow 16a. The double-acting piston 38 is coupled to a suitable source of compressed fluid, not further shown and of any standard construction; it is controlled by any suitable control apparatus, and not shown in the drawings.

In accordance with a feature of the invention, the foils are welded by ultrasonic energy, transmitted therein by a group or system 17 of sonotrodes 41.

Figure 4:
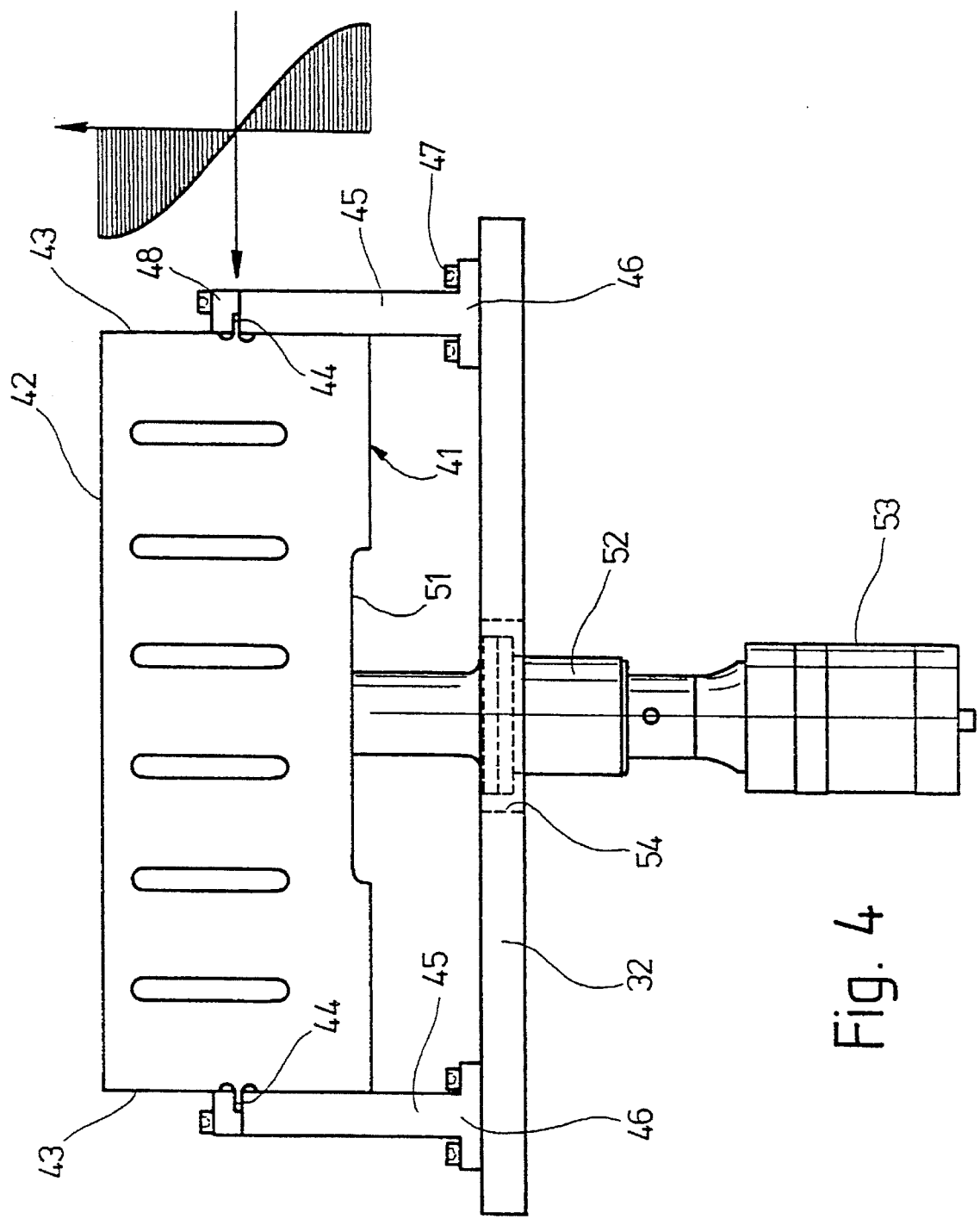
FIG. 4 is an enlarged side view of an attachment arrangement for the sonotrode of FIG. 3.

The sonotrode system 17 is formed of a group or set of individual sonotrodes 41, see FIG. 4. The sonotrodes 41 are secured to the lower frame part 31. Each sonotrode 41 is an elongated block of, for example, rectangular or square cross section; generally, it has the shape of a beam with a flat, rectangular upper surface 42 which forms the engagement surface for the working run 21 of the transport belt 18 (FIG. 2).

The sonotrodes 41 in the welding station 15 are arranged in accordance with the position or geometric location of the welding seams 8, 9, 11 of the covers 1 which are to be made. Specifically, one, each, sonotrode 41, as shown in FIG. 3, is located beneath the weld seams 9. Preferably, the length of these sonotrodes is slightly longer than the length of the weld seam 9. At least one, but preferably two individual sonotrodes 41 are located beneath the weld seam 8. They are placed as closely together to the adjacent sonotrodes as possible so that they have an essentially gapless fit against each other and with the sonotrodes 41 which are beneath the weld seams 9. One or two additional sonotrodes are located to be beneath the weld seams 11. These sonotrodes, also, fit preferably essentially gapless to the sonotrodes which make the longitudinal weld seams 8. The engagement surfaces 42 of all the sonotrodes 41, together, form an essentially closed surface on which all the weld seams 8, 9, 11 can be placed. Due to the width of the engagement surface 42, the sonotrodes 41 which are beneath the weld seams 9, extend by some small distance beneath the adjacent regions of the weld seams 8.

Figure 8:
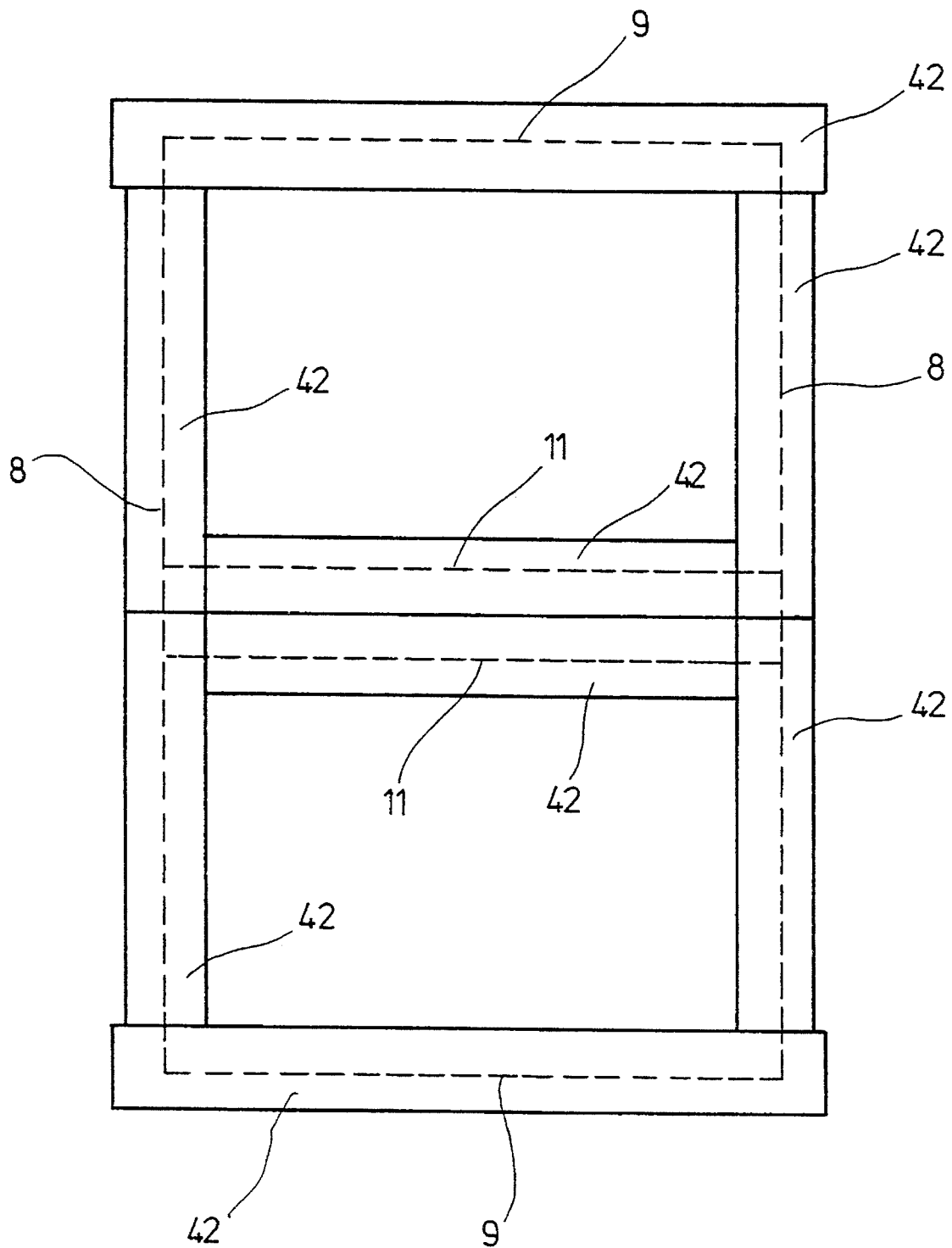
FIG. 8 is a top view of the sonotrodes illustrated in FIG. 3.

A plan view of the sonotrode system 41 is shown in FIG. 8. The weld seams are shown in FIG. 8 in broken-line representation.

In accordance with a feature of the invention, each sonotrode, of which one sonotrode 41 is shown in FIG. 4, is secured in such a manner that the attachment of the sonotrode to the frame of the apparatus occurs at a node of the acoustic energy being radiated by the sonotrode.

Figure 5:
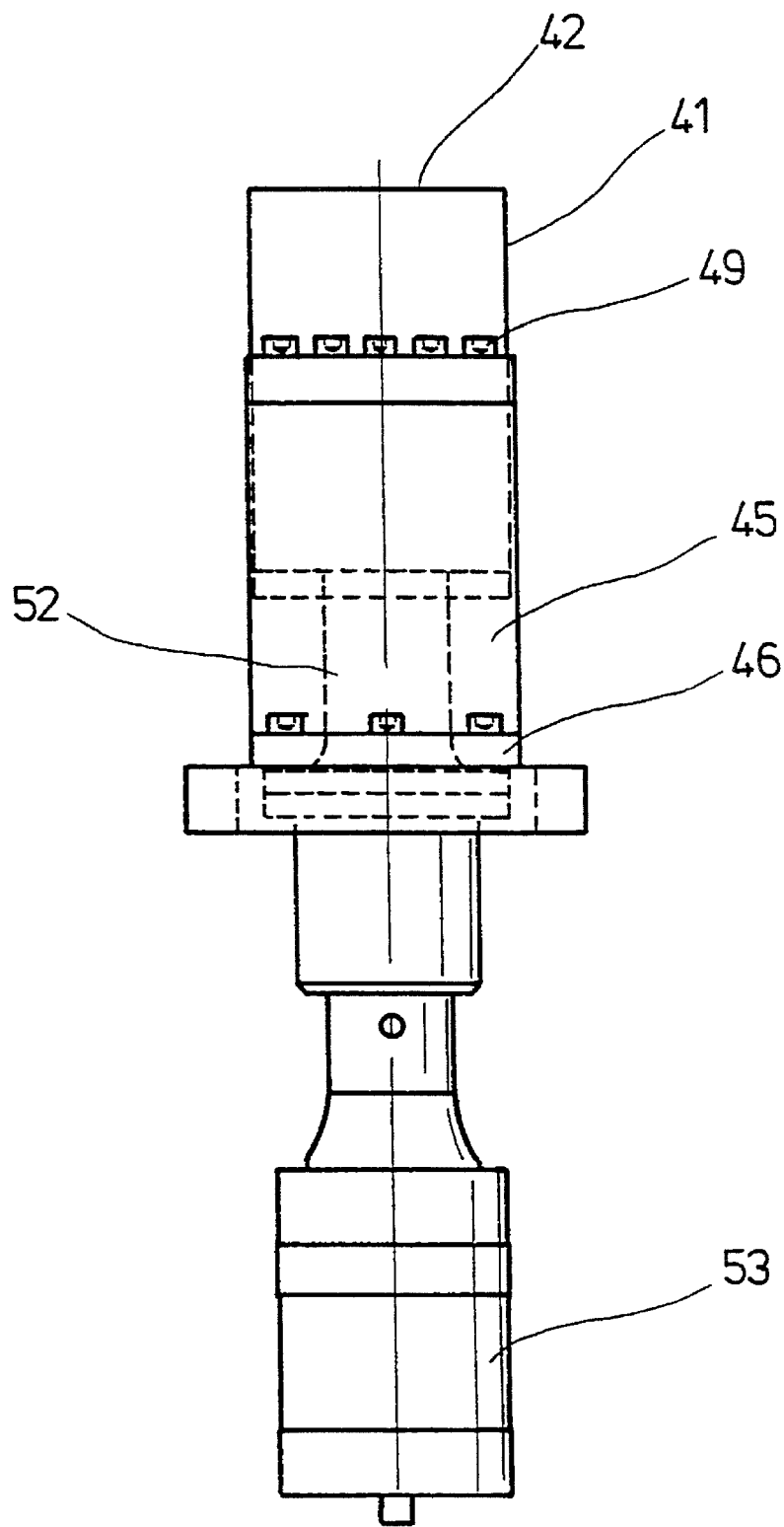
FIG. 5 is an end view of the attachment arrangement of the sonotrode of FIG. 4.

Referring to FIGS. 4 and 5, the sonotrode 41 is formed with a projection 44 at the side surfaces 43. The side surfaces 43, except for the projection 44, are planar. The projections 44 are supported on two respective essentially rectangular rods or posts 45 which, at the lower end, are formed with a flange 46. The flange 46 is secured to a respective support beam 32 of the frame 31, and secured thereon in position by screws 47. The sonotrode 41 is retained at the upper end of the posts 45 by claws 48 which are secured to the respective posts 45 by screws 49. The width of the rod or post 45, as well as of the clamping claw 48, corresponds to the width, or thickness, respectively, of the sonotrode 41, and hence corresponds to the width of the engagement surface 42; the claws are as wide as the projection 44 is long (see FIG. 5).

Each sonotrode 41 is energized by being coupled at the side opposite the engagement surface 42 to a booster 52 which is, in turn, coupled to an acoustic vibration generator in form of an electric-acoustic converter 53. The booster 52 extends through an opening 54 in the beam 32, projecting downwardly. Neither the booster 52 nor the converter 53 are coupled to the machine frame. The booster 52 extends freely through the frame 31, without touching the frame.

The function of the booster, essentially, is to form a wave-matching element so that the output of the acoustic waves from the transducer 53 will be coupled into the sonotrode 41 to generate a standing wave therein as illustrated at the right portion of FIG. 4, where the arrow marked "amplitude" indicates the excursion of the sonotrode 41, when energized. As can be clearly seen, the engagement surface 42 and the opposite surface 51 will have antinodes; the support projection 44 is positioned at a nodal point of the wave. The function of the booster is to provide a proper match from the output of the generator 53 to the surface 52 of the sonotrode 41, opposite the engagement surface 42.

The converter or transducer 53 is coupled to a suitable electrical oscillator providing the necessary electrical energy at the appropriate frequencies for the converter 53. When the electric frequency generator—not shown in the drawings and well known—is energized, the converter 53 converts electrical oscillations into mechanical oscillations which will cause the booster to, likewise, oscillate and transfer the oscillatory movements to the sonotrode 41. This causes the sonotrode 41 to oscillate or vibrate. By suitably selecting the frequency, a standing wave, having the amplitude pattern as illustrated at the right side in FIG. 4, will result. The standing wave in the sonotrode 41 has two peaks or antinodes, one of which occurring at the engagement surface 42 and the other in the region of the bottom surface 51. The nodal point between the two peaks, in case of a beam or rail-like sonotrode 41, will occur in a theoretical surface region which is parallel to the engagement surface 42 and in the center between the surface 42 and the bottom surface 51. In this nodal region, the sonotrode 41 is effectively not moving, or quiescent; this is the reason why the projections 44 are located at the height of this nodal region or plane. This prevents transmission of ultrasonic energy from the sonotrode 41 into the machine frame 14.

The two-point or, rather, two-plane support of the sonotrode 41 ensures precise alignment of the engagement surface 42 with respect to the frame 31, and hence with respect to the welding head or welding punch 16. The sonotrode 41, which is supported at the two ends, cannot bend through when the welding head 16 is moved towards the sonotrode. A uniform welding seam, thus, will be formed along the entire length of the sonotrode 41, which can be up to 30 cm or more in length, in dependence on the dimensions of the jacket 1 to be formed.

The arrangement of FIG. 4 is suitable for various patterns of seams; yet, if the sonotrode is to be fitted against an adjacent sonotrode, effectively without a gap, a different arrangement should be used.

Figure 6:
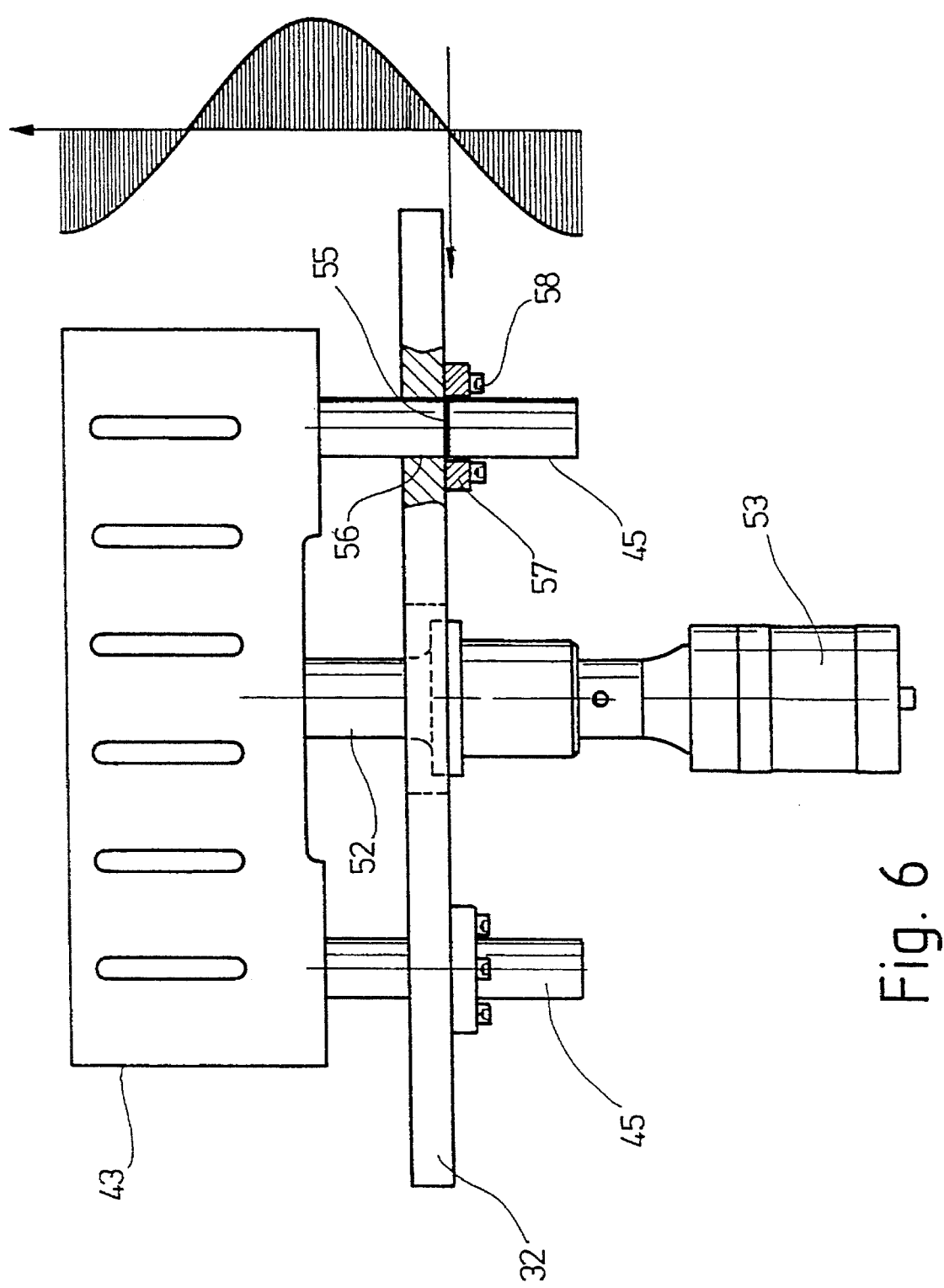
FIG. 6 is a side view of another attachment arrangement of a sonotrode.
Figure 7:
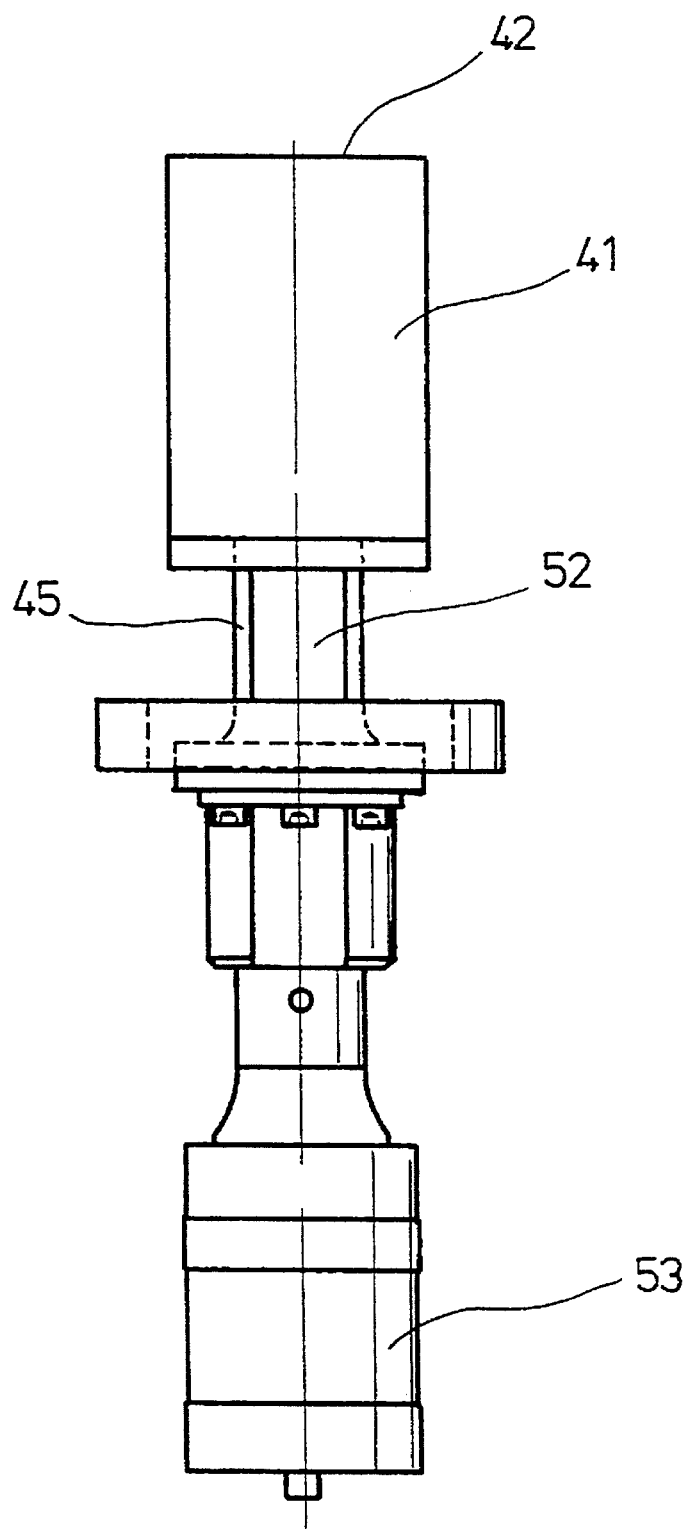
FIG. 7 is an end view of the attachment arrangement of FIG. 6.

Referring now to FIGS. 6 and 7, which leaves the side surfaces 43 of the sonotrode unobstructed, and permits gapless fitting of sonotrodes together:

The rods 45' are formed as cylindrical posts, attached to the lower surface 51 of the sonotrode 41. Their junction to the underside 51 of the sonotrode 41 is inward of the side edges 43. The cylindrical rods 45' are equally spaced with respect to the centrally positioned booster 52, and secured, for example by screws (not shown), to the lower side 51 of the sonotrode 41.

A ring-shaped flange 55 is located midway of the post 45'. The axial extent of this flange, with respect to the length of any rod 45' is small for example only about 2 mm. This flange 55 passes through a suitable bore or opening 56 in the beam 32, with some clearance, to leave some play for movement of the rods 45'. A ring 57 is secured by screws 58 to the beam 32. The ring 57, slipped from the bottom over the flange 55, presses the flange 55 on the beam 32, the screws 58 retaining the assembly in position.

It is, of course, also possible to place the flange 55 at the upper side of the beam 32 which, then, must be finished to be perfectly plane. In any event, however, except for the flange 55, the rod or post 45' should pass through the beam 32 without touching the beam.

The position of the flange 55 with respect to the sonotrodes, again, is so selected that a minimum of ultrasonic energy is coupled into the beam 32. The diagram at the right side of FIG. 6 showing the ultrasonic energy standing wave which arises within the sonotrode 41 shows, again, a peak or antinode in the region of the engagement surface 42; a second peak or antinode is at the bottom side 51. The flange 55 is placed at the position of the next nodal point, where the arrow "amplitude" illustrates zero amplitude.

If the flange 55 is placed above the beam 32, the sonotrode 41 will be located higher with respect to the beam 32 than illustrated in FIG. 6.

In contrast to the attachment arrangement in accordance with FIG. 4, the posts or rods 45 are subjected to ultrasonic energy. In order to match the standing wave transferred to the post 45' from the sonotrode, the post 45' is extended beyond the flange 55 by an extending portion 45a having a length of $\lambda/4$, in order not to interfere with the resonant tuning of the acoustic sonar system of the sonotrode and its attachment arrangement.

The basic difference between the attachment arrangement according to FIG. 4 and the attachment according to FIG. 6 is that, in the one case (FIG. 4), the sonotrode 41 is coupled to the frame via the rod 45 at a position at which no ultrasonic is emitted from the sonotrode; in the other case (FIG. 6), the attachment is at a position where the amplitude of the sonotrode has its maximum, so that the entire rod 45' also will be vibrating and subjected to ultrasonic energy. Therefore, in the embodiment of FIG. 4, it is essentially immaterial how long the rod 45 is; its length can be determined solely by engineering considerations, and convenience; in the embodiment of FIG. 6, however, the rod 45' should have a length of $\lambda/2$, to permit the flange 55 to be located at a $\lambda/4$ position, that is, essentially in the middle, where the nodal point of the energy wave occurs.

Figure 9:
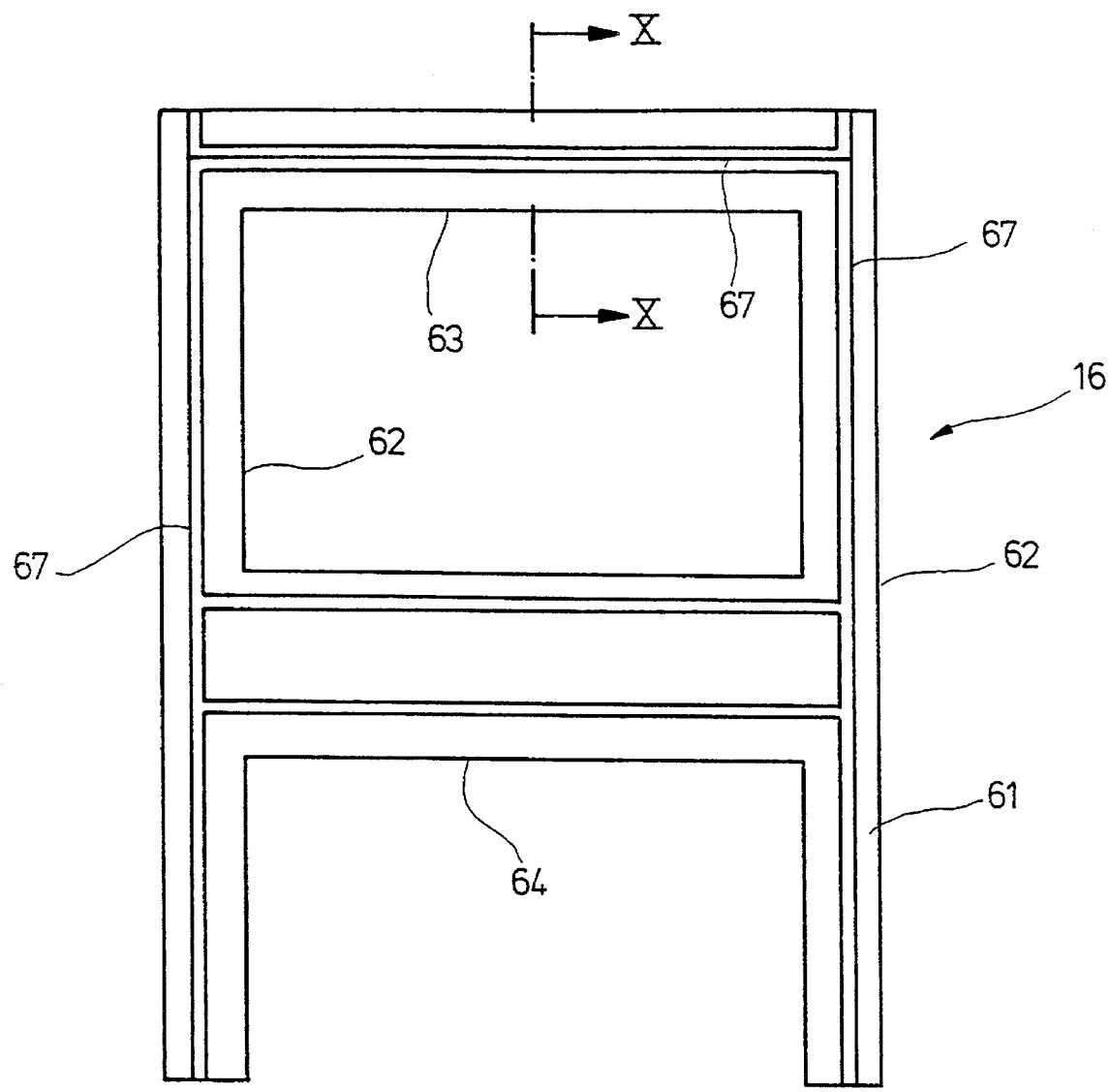
FIG. 9 is a top view of the welding head for simultaneously separating and welding the cover shown in FIG. 1.

In accordance with a feature of the invention, the welding head 16 can be arranged as illustrated in FIG. 9. The welding head 16, again, has the contours of the weld seams of the jacket 1, that is, a base frame 61 with two legs 62, spaced from each other and parallel with respect to each other, and two cross connecting legs 63, only one of which is seen in FIG. 9. Two intermediate cross connecting legs 64 are provided in order to form the back of the cover to be made.

Figure 10:
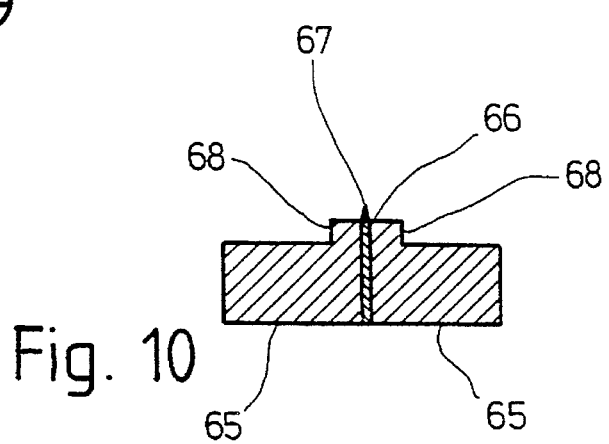
FIG. 10 is a highly schematic cross section through the welding head of FIG. 9 along the line X—X.

The leg 63, extending transversely, is seen in cross section in FIG. 10. It is formed of two adjacently positioned strips 65 between which a sharp knife blade 66, with a sharp edge 67, is inserted. The blade 66 forms a cutting edge along which the covers 1, formed in production, are separated from each other. Narrow welding surfaces 68 are located adjacent the cutting edge or cutting blade 66. They are offset slightly backwardly with respect to the cutting edge 67. The surfaces of the welding strips 68 are recessed below edge 67 by approximately the thickness of two adjacent foils 24. The width of the welding surfaces 68, measured in a direction perpendicular to the cutting knife 66, corresponds to the width of the respective weld seam to be made.

The two legs 62 are formed similarly; the only difference with respect to the showing of FIG. 10 is that only one of the welding strips 68 is provided next to the cutting knife blade 66. The leg 64, to form the seam 11, is formed withhout a cutting knife 66. Two strips 68, separated from each other, can be used.

As can be clearly seen, the welding head of FIG. 9 has only one cross connecting cutting edge 67. The welding edges 68 on the legs 62 extend across the entire cross connecting cutting edge 67. The pattern of the cutting edge 67 of the welding head of FIG. 9 thus does not coincide with the outer contour of the cover 1. The outer contour of the cover 1, rather, is obtained by applying the welding stem 16 twice on the foils 24 at positions longitudinally shifted along the length of the cover 1.

The shape of the welding head 16, as shown in FIG. 9, eliminates scrap when subsequent covers 1 are made, since the leg 63 of the welding stem 16 has the cutting edge 67 which is common for sequential covers 1. A slight longitudinal offset in transport direction, that is, in the direction of the legs 62 does not interfere with the quality of the manufactured goods; in any case, only a single cross connecting seam need be formed.

Operation with the welding head of FIG. 9:

When the welding head 16 of FIG. 9 is lowered in the direction of the sonotrode system 17 (FIG. 2) under control of the drive apparatus 38, welding seams 8 as well as the two cross seams 11 and the upstream cross seam are generated. When the welding head 16 is pressed downwardly, against the transport system 18, ultrasonic energy from the sonotrode System 17 is coupled into the foil webs 24. At those locations, where the foil webs 24 are pressed by the welding edges 68 which engage the foil webs 24, the webs 24 are plasticized by the ultrasonic energy and will weld together. Simultaneously, the cutting edges 67 sever the two foil webs 24 at the location where the cutting edges are provided.

Next, the welding head 16 is raised. Both foil webs together with the not completely finished cover 1 are transported further by the transport system 18 by a path length which corresponds to the length of the cover 1, measured between the cross seams 9. In a preceding operating stroke of the welding head 16, the downstream located cross seam 9 as well as a short piece of the longitudinal weld seams 8 were generated. In the subsequent welding stroke, the remainder of the longitudinal weld seams 8 is formed, as well as the cross seams 11 and the upstream cross seam 9. Simultaneously therewith, for the now third cover 1, the downstream cross seam 9 and a portion of the two longitudinal seams 8 are made.

Except for the very first cover 1, which is scrap, two sequential strokes of the welding head 16 generate complete covers 1 without any scrap between sequential covers 1. Rather, sequential covers 1 immediately follow each other at the cutting edge and, from then on, sequential covers 1 are formed, simultaneously, with fitting cross seams 9, one next to the other, severed from each other, at each stroke.

The arrangement of the sonotrodes illustrated in FIG. 8 is particularly arranged for the weld seams 8, 9, and with them the welding edges 68 and cutting edges 67, respectively. A machine which has sonotrodes of this type is optimized to make the covers of FIG. 1. It is also possible to use machines of this type with different articles in which the welding seams are differently arranged.

Figure 11:
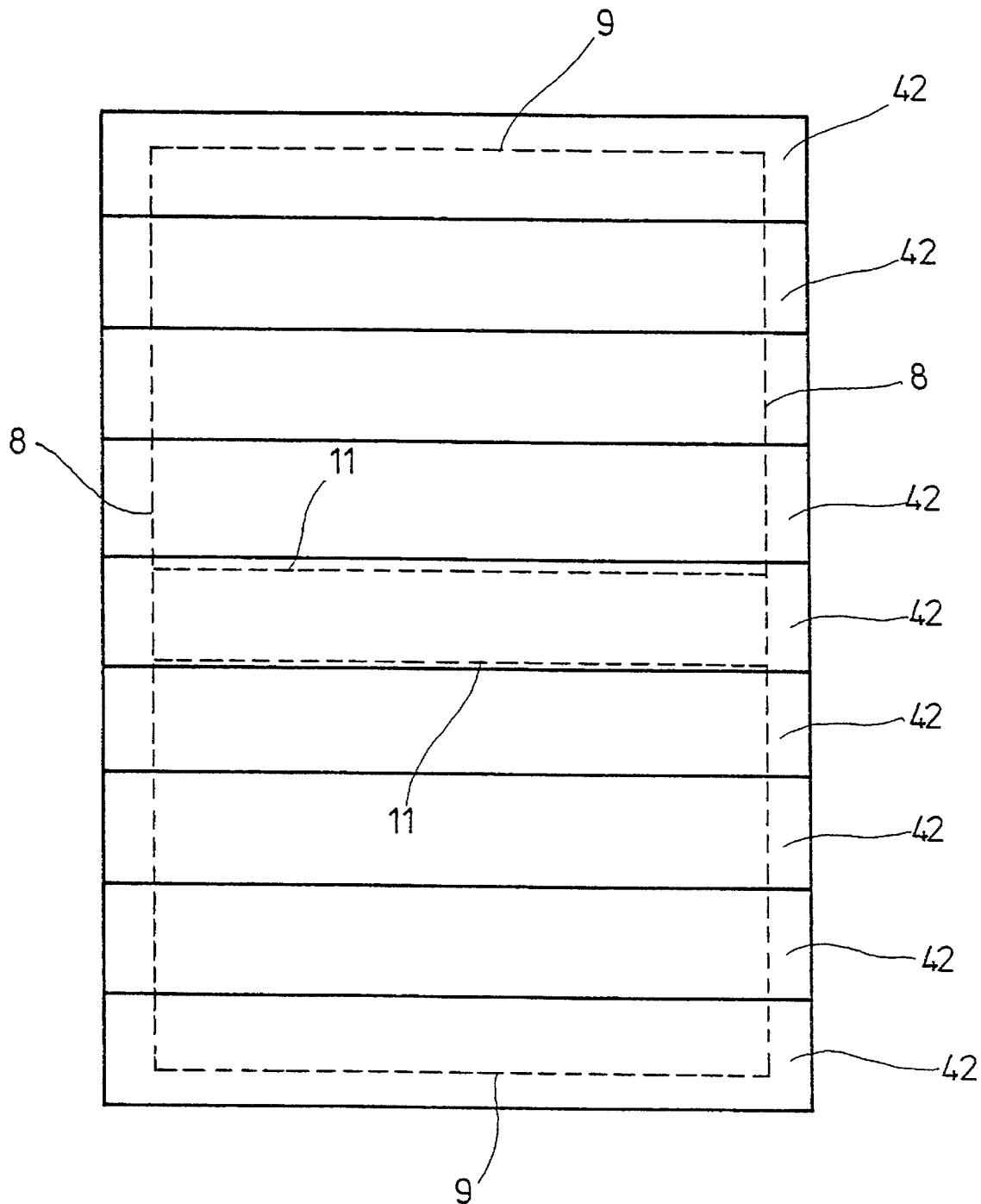
FIG. 11 is a top view of another arrangement of the sonotrodes in the apparatus of FIG. 2.

Referring now to FIG. 11: The sonotrodes include nine essentially beam-like sonotrodes 41 having sonotrode engagement surfaces 42 located with their longitudinal axes parallel next to each other. Immediately adjacent sonotrodes practically touch each other. These nine sonotrodes form a large closed table surface on which all articles can be produced, which have an outer contour less than the surface of this table. The overall dimensions of such a table, for example, are up to about 40×80 cm. The operation is the same as that above described; any type of foil such as polypropylene which can be plasticized and has only a very narrow welding temperature region can be worked on. Polypropylene requires accurately determined operating temperature; below a narrow range, the material does not soften; above the narrow range, the material becomes too fluid and tends to flow away. The temperature range in which the materials are merely softened and can be welded together by compression with a welding head thus is very narrow. When using ultrasonic welding, there is no danger of overheating or insufficient heat supply.

Welding, of course, will occur only where there is tight mechanical engagement between the top of the sonotrodes 41 and the foils, as determined by the shape of the welding head 16. Thus, if the welding head 16 has an outline as shown, for example, in FIG. 9, or narrow welding head strips 68 as shown by the broken lines in FIG. 8, only those regions will be welded. The other regions of the foils, where the foil is loosely located on the transport belt, will not be affected.

Folder jackets, reinforced jackets for binders such as ring binders and the like, require comparatively long weld seams. Accordingly, the apparatus must be so arranged that the entire length of the weld seam will have approximately uniform welding pressures applied thereagainst by the welding head 16. To ensure a proper counter element to the welding head, the sonotrodes 41 must be securely attached to the frame 14 of the machine. It is desirable that each sonotrode be attached by at least two spaced attachment arrangements to the machine frame 14. This ensures precise flat engagement surfaces and precise planar conditions of all engagement surfaces of the sonotrodes which are necessary to provide reliable welds. The oscillation generating system, that is, the oscillation generator 53 and the booster 52, additionally can be used to provide for stability. The oscillation generator itself, however, should be separate from the machine frame, and connected mechanically only to the sonotrode, as explained in connection with FIGS. 4 and 6.

Acoustic losses, which eventually reflect themselves in electrical losses due to ultrasonic energy which is absorbed by the machine frame without any effective welding action can be prevented by so attaching the sonotrodes or the attachment elements, respectively, that the wave lengths of the ultrasonic oscillations and the attachment arrangement are suitably matched. An essentially loss-free attachment arrangement provides formation of suitable holding projections on the electrode at the outer facing surfaces (see FIG. 4), in which the projections are so spaced from the engagement surface 42 that the standing waves of the frequency matched to the dimensions of the sonotrode will result in a wave node in the plane of the attachment projections. Alternatively, the attachment arrangements can be rods or posts 45' (FIG. 6), the length of which up to the machine frame, is a half wave length, so that the attachment point of the support post 45 (FIG. 4) to the sonotrode is at a node of the vibration and, for additional reliability, the attachment point of the post to the underlying frame, for example beam 32, is a half wave length, so that, again, the post-frame connection 45–32 will be at a nodal point.

Alternatively, and see FIG. 6, rods 45' can be used which are coupled to the surface 51 opposite the engagement surface 42 of the sonotrode 41. This surface, usually, has an antinode or oscillation or wave peak, since the amplitude of the oscillation at the opposite surfaces of the sonotrode are a maximum. In this arrangement, also, the sonotrode can be coupled to the machine frame 14 without introducing ultrasonic energy into the frame, by using rods or posts 45' having a length of a half wave length, and coupled to the machine frame at a quarter wave length position, by a flange 55 or the like, which is then attached to the machine frame 14, for example a cross beam 32. In both cases, the rods 45 or 45' have a longitudinal axis which is perpendicular to the respective engagement surface 42 and the opposite surface 51, respectively.

The welding head can also be arranged such that a cross connecting edge of one product forms also the limit for the next product. When the welding head is so constructed, in one welding cycle a downstream—with respect to transport direction—product is completed, while the first cross edge and a portion of the longitudinal welding seams of the subsequent product is made. This arrangement substantially reduces scrap cut off from the foils, since the scrap between adjacent products is eliminated. The scrap, then, will only be two lateral strips in order to maintain the lateral dimension; the previously arising cross connections of scrap, forming the prior art rope ladder arrangement, is eliminated. This substantially reduces the complexity in handling the cut-off scrap.

A welding head with reduced scrap generation requires two strokes for making a complete cover. Even if in longitudinal direction, some slight offset or inaccuracy may result, it is hardly visible towards the outside because the longitudinal weld seams will overlap slightly at the offset point. The distance of the cross seams, thus, may vary by fractions of a millimeter. This, however, is not noticeable in the jacket covers which are usually made, in which the cross seams have spacings of between 20–30 cm. The combination cut and seam will not be made at a terminal edge of the head structure, but rather intermediate its length (see FIG. 9).

Various changes and modifications may be made, and any features described herein may be used with any of the others, within the scope of the inventive concept.

I claim:

1. Apparatus for manufacturing of folders or binder jackets (1), wherein the folders or binder jackets comprise two foils (24) of thermoplastic material, welded together at weld seams (8, 9, 11), wherein said apparatus comprises a frame (14);

a welding head (16) movably mounted on the frame (14), said welding head having elongated, continuously extending welding edges (68), all located in essentially a single plane and being shaped to match the contours of the weld seams (8, 9, 11) of the foils;

a sonotrode system (17) mounted on the frame (14) and located spaced from, and essentially parallel to the welding head (16), said sonotrode system (17) comprising a plurality of elongated, continuously extending sonotrodes (41);

means (16a, 38) for relatively moving the welding head (16) and the sonotrode system (17) towards each other, with the thermoplastic foils (24) therebetween; and an ultrasound generator means (52, 53) acoustically coupled to the sonotrodes (41) to excite the sonotrodes with ultrasonic vibrations.

2. The apparatus of claim 1, wherein said sonotrodes (41) are individually secured to the machine frame (14), said sonotrodes (41) having a plane engagement surface (42) for the foils (24), the engagement surfaces (42) of all the sonotrodes (41) in the sonotrode system (17) being coplanar; and wherein at least some of said sonotrodes (41) of the system (17) have essentially gapless engagement with adjacent sonotrodes.

3. The apparatus of claim 1, wherein said sonotrodes (41) have a plane engagement surface (42) for the foils (24), the engagement surfaces (42) of all the sonotrodes (41) in the sonotrode system (17) being coplanar; and wherein the longitudinal axes of the engagement surfaces (42) are parallel to the welding edges of the welding head (16).

4. The apparatus of claim 1, wherein the plurality of 41 of the sonotrode system (17) are of essentially beam or rail shape.

5. The apparatus of claim 1, wherein the sonotrodes (41) are elongated and the ultrasonic generator means comprises a plurality of ultrasonic generators (52, 53) coupled thereto essentially centrally of the length of the respective sonotrodes (41), and located at a surface (51) opposite an engagement surface (42) of the sonotrode for the foils (24).

6. The apparatus of claim 5, wherein the ultrasonic generators (52, 53) provide longitudinal oscillations to the respective sonotrode (41) in a direction which is perpendicular to said engagement surface (42).

7. The apparatus of claim 2, wherein the sonotrodes (41) are located essentially gapless next to each other with the longitudinal axes of the sonotrodes arranged parallel to each other, said sonotrodes, each, having engagement surfaces (42) forming, in the arrangement of the sonotrodes, an essentially closed table surface; and wherein the dimension of the table surface corresponds to the maximum size of the foils (24) to be formed into said jackets or binders (1).

8. The apparatus of claim 1, wherein the welding head (16) has cutting blade means (66, 67) positioned adjacent those welding edges (68) which are located laterally of the folders or binder jackets (1) to form longitudinal seams (8), said welding head further having a cutting blade (66, 67) positioned between two welding edges, whereby the cutting blade will be located intermediate said two welding edges, to form a combined double-weld and a severing cut, said two welding edges and cutting blade therebetween being located to form two transverse seams (9) and a transverse cut intermediate said two transverse seams in said foils, and wherein, in one movement of said moving means, two fragmentary portions of a folder or jacket are welded along the longitudinal seams, and upon a subsequent operation of the moving means, the folder or jacket is finished and the fragmentary portion of a subsequent folder or jacket is formed, and severed from the finished jacket by the cutting blade, whereby the cutting blade will sever the foils at a position intermediate the location of the foils on the engagement surfaces of adjacently located sonotrodes.

9. Apparatus for manufacturing of folders or binder jackets (1), wherein the folders or binder jackets comprise two foils (24) of thermoplastic material, welded together at weld seams (8, 9, 11), wherein said apparatus comprises a frame (14);

a welding head (16) movably mounted on the frame (14), said welding head having elongated, continuously extending welding edges (68), all located in essentially a single plane and being shaped to match the contours of the weld seams (8, 9, 11) of the foils;

plasticizing means (17) mounted on the frame (14) and located spaced from, and essentially parallel to, the welding head (16);

means (16a, 38) for relatively moving the welding head and the plasticizing means (17) towards each other, with the thermoplastic foils (24) therebetween; and wherein the welding head has elongated, continuously extending cutting blade means (66, 67) positioned adjacent those welding edges (68) which are located laterally of the folders or binder jackets (1) to form longitudinal seams (8), said welding head further having a cutting blade (66, 67) positioned between two welding edges, whereby the cutting blade will be located intermediate said two welding edges, to form a combined double-weld and a severing cut, said two welding edges and cutting blade therebetween being located to form two transverse seams (9) and a transverse cut intermediate said two transverse seams in said foils, and wherein, in one movement of said moving means, two fragmentary portions of a folder or a jacket are welded along the longitudinal seams and, upon a subsequent operation of the moving means, the folder or jacket is finished and the fragmentary portion of a subsequent folder or jacket is formed, and severed from the finished jacket by the cutting blade.

10. Apparatus for manufacturing of folders or binder jackets (1), wherein the folder or binder jackets comprise two foils (24) of thermoplastic material, welded together at weld seams (8, 9, 11), wherein said apparatus comprises a frame (14);

a welding head (16) movable mounted on the frame (14), a welding head having elongated, continuously extending welding edges (68), all located in essentially a single plane and being shaped to match the contours of the weld seams (8, 9, 11) of the foils;

a sonotrode system (17) mounted on the frame (14) and located spaced from, and essentially parallel to the welding head (16), said sonotrode system (17) comprising a plurality of elongated, continuously extending sonotrodes (41);

means (16a, 38) for relatively moving the welding head (16) and the sonotrode system (17) towards each other, with the thermoplastic foils (24) therebetween;

an ultrasound generator means (52, 53) acoustically coupled to the sonotrodes (41) to excite the sonotrodes with ultrasonic vibrations; and at least two attachment means (45) mechanically coupling the sonotrodes (41) of the sonotrode system to the machine frame (14).

11. The apparatus of claim 10, wherein said sonotrodes (41) are individually secured to the machine frame (14), said sonotrodes (41) having a plane engagement surface (42) for the foils (24), the engagement surface (42) of all the sonotrodes (41) in the sonotrode system (17) being coplanar; and wherein at least some of said sonotrodes (41) of the system (17) have essentially gapless engagement with adjacent sonotrodes.

12. The apparatus of claim 10, wherein said sonotrodes (41) are essentially of elongated shape and have a plane engagement surface (42) for the foils (24), the engagement surfaces (42) of all the sonotrodes (41) in the sonotrode system (17) being coplanar; and wherein the longitudinal axes of the engagement surfaces (42) are parallel to the welding edges of the welding head (16).

13. The apparatus of claim 10, wherein the sonotrodes (41) are located essentially gapless next to each other with the longitudinal axes of the sonotrodes arranged parallel to each other, said sonotrodes, each, having engagement surfaces (42) forming, in the arrangement of the sonotrodes, an essentially closed table surface; and wherein the dimension of the table surface corresponds to the maximum size of the foils (24) to be formed into said jackets or binders (1).

14. The apparatus of claim 10 wherein each sonotrode (41) is coupled to an ultrasonic generator (52, 53), and said attachment means (45) retain both the sonotrode as well as said ultrasonic generator coupled thereto on the machine frame (14).

15. The apparatus of claim 10, wherein said attachment means (45) comprises at least one rod or post (45) coupled to the respective sonotrodes (41) at a position on the sonotrodes in which the sonotrode, when excited to ultrasonic oscillations, has a wave or oscillation node.

16. The apparatus of claim 15, wherein said post or rod (45) is dimensioned, between an engagement point (44) on the sonotrode and a second engagement point on the machine frame (14), to have a length essentially equal to a half wave length of the ultrasonic oscillation, or a whole multiple thereof.

17. The apparatus of claim 15, wherein the sonotrode (41) is essentially or rail or beam-shaped, and defines two end surfaces (43); and wherein one rod or post, each, is coupled to a respective end surface (43).

18. The apparatus of claim 17, wherein the sonotrode (41) is formed with a projection (44) integral with the sonotrode and extending from each respective end surface (43) for attachment to the respective post or rod (45).

19. The apparatus of claim 10, wherein the attachment means comprises a rod (45') coupled to a surface (51) of the sonotrode opposite an engagement surface (42) for the foils;

wherein said post or rod (45') is formed with a lateral projection (55) positioned at a location on the post or rod where, when the sonotrode is excited to ultrasonic oscillations, the post or rod will have a wave node; and wherein said lateral projection is secured to the machine frame (14) at essentially said location of the wave node.

20. The apparatus of claim 19, wherein said projection comprises a circular flange (55) surrounding the post or rod (45').

21. The apparatus of claim 19, wherein the post or rod (45') extends beyond said projection for a distance at which, when the sonotrode is excited to ultrasonic oscillations, a wave peak or antinode will occur.

22. The apparatus of claim 10, wherein the attachment means comprises a post or rod (45, 45') coupled to the machine frame and extending in a plane which is essentially perpendicular to an engagement surface (42) for the foils (24) on the sonotrode.

23. The apparatus of claim 10, further including an endless transport belt (18) located between the sonotrode system (17) and the welding head (16); and wherein the foils (24) are located between the transport belt (18) and the welding head (16).

* * * * *